(12) United States Patent
Stratton

(10) Patent No.: US 12,005,345 B2
(45) Date of Patent: Jun. 11, 2024

(54) VIDEO GAME CONTROLLER

(71) Applicant: Riley Simons Stratton, Rexburg, ID (US)

(72) Inventor: Riley Simons Stratton, Rexburg, ID (US)

( * ) Notice: Subject to any disclaimer, the term of this patent is extended or adjusted under 35 U.S.C. 154(b) by 186 days.

(21) Appl. No.: 17/504,015

(22) Filed: Oct. 18, 2021

(65) Prior Publication Data

US 2023/0123040 A1  Apr. 20, 2023

(51) Int. Cl.
*A63F 13/24* (2014.01)
*G06F 3/02* (2006.01)
*G06F 3/0338* (2013.01)

(52) U.S. Cl.
CPC ............ *A63F 13/24* (2014.09); *G06F 3/0219* (2013.01); *G06F 3/0338* (2013.01)

(58) Field of Classification Search
CPC .......... A63F 13/24; G06F 3/02; G06F 3/0219; G06F 3/0338
See application file for complete search history.

(56) References Cited

U.S. PATENT DOCUMENTS

| | | | | |
|---|---|---|---|---|
| 5,630,756 A * | 5/1997 | Thurston | ................. | G05G 9/047 345/161 |
| 6,580,418 B1 * | 6/2003 | Grome | ..................... | A63F 13/22 345/161 |
| 10,137,366 B1 * | 11/2018 | Quesnel | ................... | A63F 13/98 |
| 10,279,254 B2 * | 5/2019 | Mikhailov | ............ | G06F 3/0304 |
| 2005/0277470 A1 * | 12/2005 | Watanachote | .......... | A63F 13/24 463/37 |
| 2008/0174550 A1 * | 7/2008 | Laurila | .................. | A63F 13/285 345/158 |
| 2008/0217075 A1 * | 9/2008 | Gordner | ................ | G06F 3/0234 178/18.01 |
| 2009/0269724 A1 * | 10/2009 | Thomas | .................... | G09B 9/12 434/45 |
| 2012/0276994 A1 * | 11/2012 | Lansdale | .................. | A63F 13/53 463/31 |
| 2019/0015751 A1 * | 1/2019 | Kahn, II | ................. | A63F 13/212 |
| 2019/0022522 A1 * | 1/2019 | Croft | ...................... | G06F 3/0338 |
| 2020/0368610 A1 * | 11/2020 | Kawasaki | ................ | A63F 13/23 |
| 2021/0379486 A1 * | 12/2021 | Ishikawa | .................. | G06F 3/016 |

* cited by examiner

*Primary Examiner* — David L Lewis
*Assistant Examiner* — Shauna-Kay N. Hall
(74) *Attorney, Agent, or Firm* — The Iwashko Law Firm, PLLC; Lev Ivan; Gabriel Iwashko

(57) ABSTRACT

A video game controller, including a first joystick, including a first body having an elongate shape, and a directional pad disposed on at least a portion of a first end of the first body to input at least one input corresponding to each point of the directional pad, a second joystick, including a second body having an elongate shape, and a plurality of action buttons disposed on at least a portion of the second body to input at least one action input in response to depressing at least one of the plurality of action buttons, and a base to removably connect to at least one of a second end of the first body and a second end of the second body.

7 Claims, 3 Drawing Sheets

VIDEO GAME CONTROLLER

BACKGROUND

1. Field

The present general inventive concept relates generally to video games, and particularly, to a video game controller.

2. Description of the Related Art

Video games are an intriguing and popular activity for many people. Video games often provide safe and convenient entertainment for a player. Currently, the video game market has a wide variety of games and different video game systems for the player to use.

However, standard controllers for video game systems are uncomfortable and do not properly conform to the hands of the player. Generally, a joysticks is unable to move while pressing other buttons with a thumb. In other words, the player must move the thumb to press and/or move the joystick and/or the buttons, but not both simultaneously.

Therefore, there is a need for a video game controller that streamlines game play and doesn't require the user to remove the thumb off the joystick to press a button.

SUMMARY

The present general inventive concept provides a video game controller.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a video game controller, including a first joystick, including a first body having an elongate shape, and a directional pad disposed on at least a portion of a first end of the first body to input at least one input corresponding to each point of the directional pad, a second joystick, including a second body having an elongate shape, and a plurality of action buttons disposed on at least a portion of the second body to input at least one action input in response to depressing at least one of the plurality of action buttons, and a base to removably connect to at least one of a second end of the first body and a second end of the second body.

The first joystick may further include a first trigger button disposed on at least a portion of a first side of the first body to input a first trigger command in response to being depressed, a first bumper button disposed on at least a portion of the first side of the first body to input a first bumper command in response to being depressed, a first menu button disposed on at least a portion of a second side of the first body different from the first side to input a menu command in response to being depressed, and a first home button disposed on at least a portion of the second side of the first body to input a home menu command in response to being depressed.

The first joystick may further include a plurality of finger receiving grooves concavely disposed on at least a portion of the first side of the first body to facilitate gripping thereof.

The second joystick may further include a second trigger button disposed on at least a portion of a first side of the second body to input a second trigger command in response to being depressed, a second bumper button disposed on at least a portion of the first side of the second body to input a second bumper command in response to being depressed, a second menu button disposed on at least a portion of a second side of the second body different from the first side to input a menu command in response to being depressed, and a second home button disposed on at least a portion of the second side of the second body to input a home menu command in response to being depressed.

The second joystick may further include a plurality of finger receiving grooves concavely disposed on at least a portion of a first side of the second body to facilitate gripping thereof.

The first joystick and the second joystick, each may further include a pivoting portion disposed on the second end to facilitate movement in any direction with respect to a first plane.

The first joystick and the second joystick, each may further include a connector disposed on at least a portion of the second end to receive power from the base.

The video game controller may further include a heart rate sensor disposed within at least a portion of at least one of the first body and the second body to detect a heart rate level in response to contact from a hand of the user.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
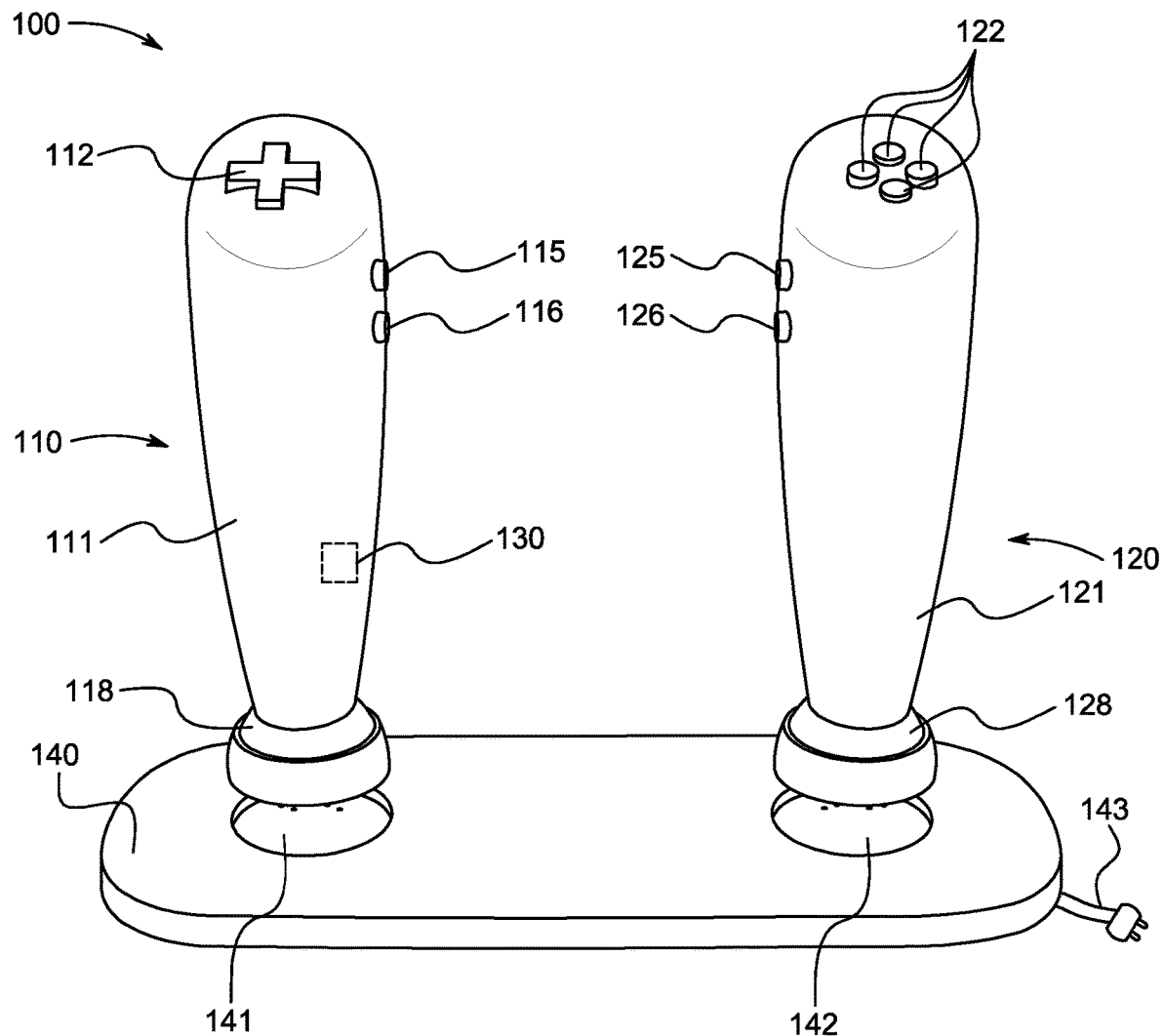
FIG. 1A illustrates a rear perspective view of a video game controller, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Video Game Controller 100
First Joystick 110
First Body 111
Directional Pad 112
First Trigger Button 113
First Bumper Button 114
First Menu Button 115
First Home Button 116
Finger Receiving Grooves 117
First Pivoting Portion 118
First Connector 119
Second Joystick 120
Second Body 121
Action Buttons 122
Second Trigger Button 123
Second Bumper Button 124
Second Menu Button 125
Second Home Button 126
Finger Receiving Grooves 127
Second Pivoting Portion 128
Second Connector 129
Heart Rate Sensor 130
Base 140
First Joystick Receiving Groove 141
Second Joystick Receiving Groove 142
Power Source 143

FIG. 1A illustrates a rear perspective view of a video game controller 100, according to an exemplary embodiment of the present general inventive concept.

Figure 1B:
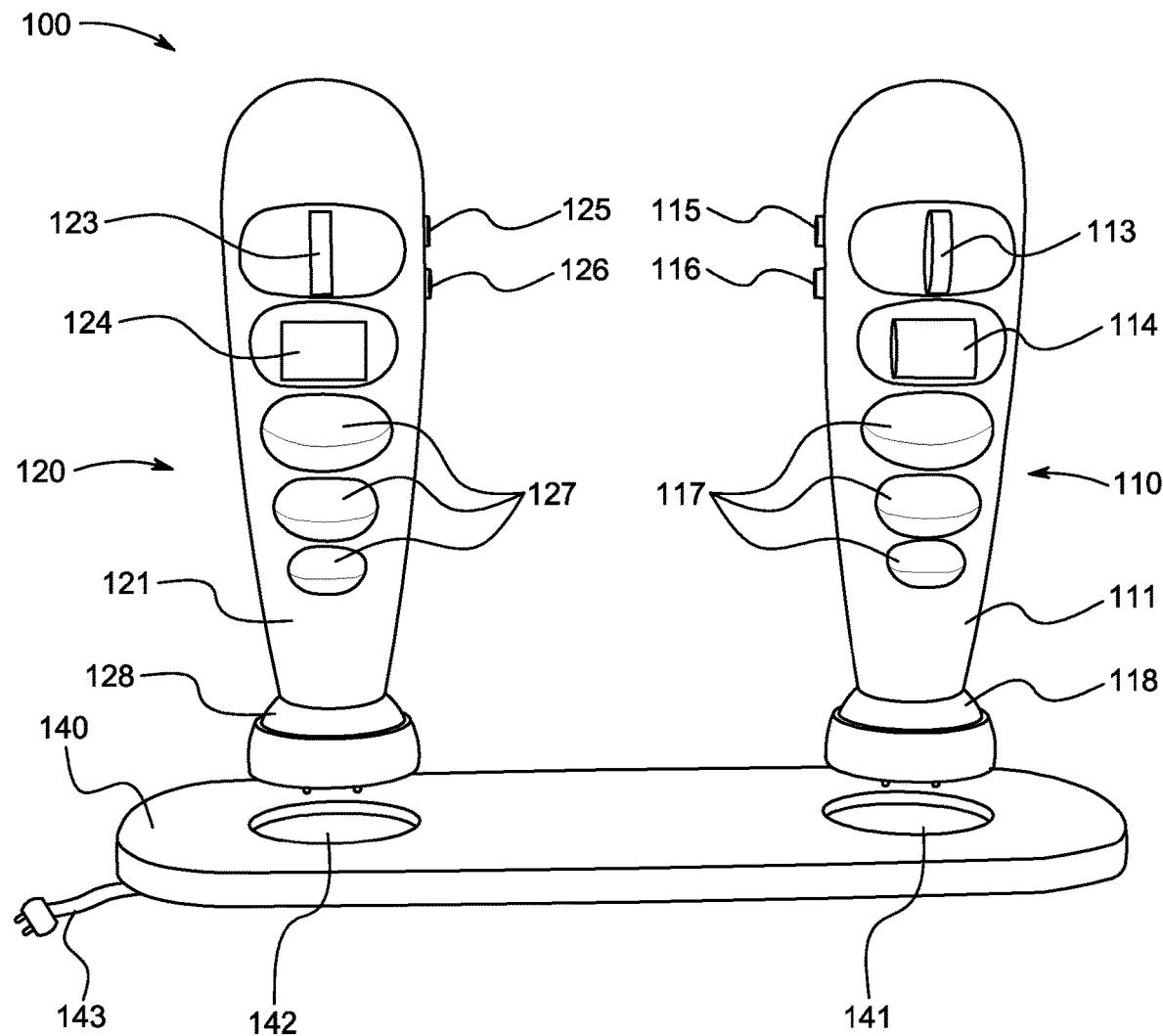
FIG. 1B illustrates a front perspective view of the video game controller, according to an exemplary embodiment of the present general inventive concept.

FIG. 1B illustrates a front perspective view of the video game controller 100, according to an exemplary embodiment of the present general inventive concept.

Figure 2:
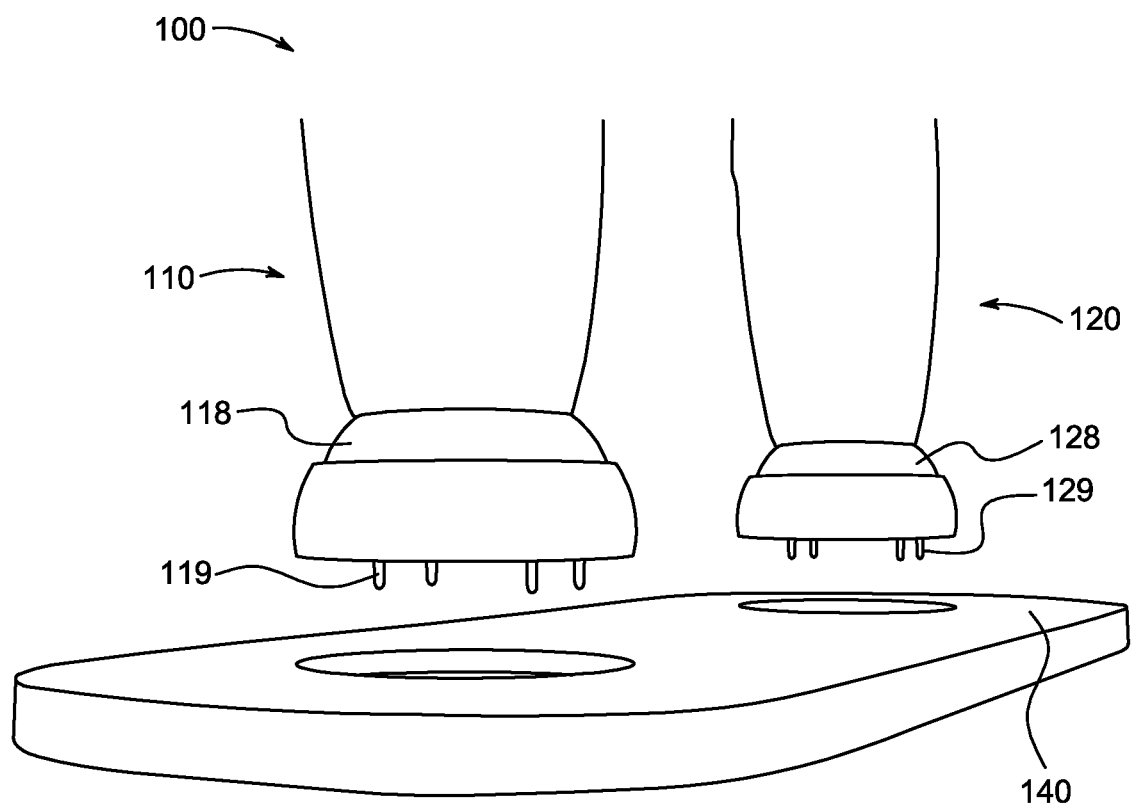
FIG. 2 illustrates a zoomed in view of a bottom portion of the video game controller, according to an exemplary embodiment of the present general inventive concept.

FIG. 2 illustrates a zoomed in view of a bottom portion of the video game controller 100, according to an exemplary embodiment of the present general inventive concept.

The video game controller 100 may be constructed from at least one of metal, plastic, wood, glass, and rubber, etc., but is not limited thereto.

The video game controller 100 may include a first joystick 110, a second joystick 120, a heart rate sensor 130, and a base 140, but is not limited thereto.

The first joystick 110 may include a first body 111, a directional pad 112, a first trigger button 113, a first bumper button 114, a first menu button 115, a first home button 116, a plurality of finger receiving grooves 117, a first pivoting portion 118, and a first connector 119, but is not limited thereto.

Referring to FIG. 1, the first body 111 may have an elongate shape. Moreover, the first body 111 may have a variety of sizes based on a size of a hand of a user. In other words, a size of the first body 111 for an adult may be greater than a size of the first body 111 for a child. The first body 111 may receive a first hand thereon.

The directional pad 112 may be disposed on at least a portion of a first end (i.e. top end) of the first body 111. The directional pad 112 may have a cross shape, such that the directional pad 112 may provide at least one input (e.g., four different inputs) corresponding to each point of the cross. For example, the directional pad 112 may input north, south, east, and/or west based on a section of the directional pad 112 being depressed.

The first trigger button 113 may be disposed on at least a portion of a first side of the first body 111. The first trigger button 113 may input a first trigger command in response to being depressed. For example, the first trigger button 113 may fire a weapon in a video game in response to being depressed.

The first bumper button 114 may be disposed on at least a portion of the first side of the first body 111 below the first trigger button 113 (i.e. towards a second end of the first body 111). The first bumper button 114 may input a first bumper command in response to being depressed. For example, the first bumper button 114 may reload the weapon in the video game in response to being depressed.

The first menu button 115 may be disposed on at least a portion of a second side of the first body 111 different from the first side. The first menu button 115 may input a menu command in response to being depressed. For example, the first menu button 115 may open a game menu in the video game in response to being depressed.

The first home button 116 may be disposed on at least a portion of the second side of the first body 111 below the first menu button 115 (i.e. towards the second end of the first body 111). The first home button 116 may input a home menu command in response to being depressed. For example, the first home button 116 may navigate to a home screen of a game system in response to being depressed.

The plurality of finger receiving grooves 117 may be concavely disposed on at least a portion of the first side of the first body 111 below the first bumper button 114. Moreover, the plurality of finger receiving grooves 117 may facilitate gripping thereof. Specifically, the plurality of finger receiving grooves 117 may curve toward an interior portion of the first body 111 to receive at least one finger therein, such that the plurality of finger receiving grooves 117 may prevent movement of the at least one finger in a perpendicular direction with respect to each of the plurality of finger receiving grooves 117.

The first pivoting portion 118 may be disposed on at least a portion of the second end of the first body 111. The first pivoting portion 118 may facilitate movement of the first body 111. Moreover, the first body 111 may move (i.e. pivot) in response to an application of force thereto against the first pivoting portion 118 in any direction (i.e. three hundred sixty degrees) with respect to a first plane that is perpendicular with respect to a length of the first body 111 from the first end to the second end thereof. Also, the first body 111 may pivot a predetermined angle with respect to a second plane parallel to the length of the first body 111 from the first end to the second end. For example, the first body 111 may pivot thirty degrees forward, backward, left, and/or right.

The first connector 119 may be springingly (i.e., using a spring) disposed on at least a portion of the second end of the first body 111. The first connector 119 may be contact pins and include a battery therein.

The second joystick 120 may include a second body 121, a plurality of action buttons 122, a second trigger button 123, a second bumper button 124, a second menu button 125, a second home button 126, a plurality of finger receiving grooves 127, a second pivoting portion 128, and a second connector 129, but is not limited thereto.

Referring to FIG. 1, the second body 121 may have an elongate shape. Moreover, the second body 121 may have a variety of sizes based on the size of the hand of the user. In other words, a size of the second body 121 for an adult may be greater than a size of the second body 121 for a child. The second body 121 may receive a second hand thereon.

The plurality of action buttons 122 may be disposed on at least a portion of a first end (i.e. top end) of the second body 121. The plurality of action buttons 122 may have a cross shape, such that the plurality of action buttons 122 may provide four different inputs corresponding to each of the plurality of action buttons 122. For example, a first of the plurality of action buttons 122 may input "A", a second of the plurality of action buttons 122 may input "B", a third of the plurality of action buttons 122 may input "X", "and a fourth of the plurality of action buttons 122 may input "Y" in response to being depressed. In other words, the plurality of action buttons 122 may input at least one action input in response to depressing at least one of the plurality of action buttons 122. Accordingly, the plurality of action buttons 122 may perform different actions based on the video game.

The second trigger button 123 may be disposed on at least a portion of a first side of the second body 121. The second trigger button 123 may input a second trigger command in response to being depressed. For example, the second trigger button 123 may fire a weapon in the video game in response to being depressed.

The second bumper button 124 may be disposed on at least a portion of the first side of the second body 121 below the second trigger button 123 (i.e. towards a second end of the second body 121). The second bumper button 124 may input a second bumper command in response to being depressed. For example, the second bumper button 124 may reload the weapon in the video game in response to being depressed.

The second menu button 125 may be disposed on at least a portion of a second side of the second body 121 different from the first side. The second menu button 125 may input a menu command in response to being depressed. For example, the second menu button 125 may open a game menu in the video game in response to being depressed.

The second home button 126 may be disposed on at least a portion of the second side of the second body 121 below the second menu button 125 (i.e. towards the second end of the second body 121). The second home button 126 may input a home menu command in response to being depressed. For example, the second home button 126 may navigate to a home screen of a game system in response to being depressed.

The plurality of finger receiving grooves 127 may be concavely disposed on at least a portion of the first side of the second body 121 below the second bumper button 124. Moreover, the plurality of finger receiving grooves 127 may facilitate gripping thereof. Specifically, the plurality of finger receiving grooves 127 may curve toward an interior portion of the first body 121 to receive at least one finger therein, such that the plurality of finger receiving grooves 127 may prevent movement of the at least one finger in a perpendicular direction with respect to each of the plurality of finger receiving grooves 127.

The second pivoting portion 128 may be disposed on at least a portion of the second end of the second body 121. The second pivoting portion 128 may facilitate movement of the second body 121. Moreover, the second body 121 may move (i.e. pivot) in response to an application of force thereto against the second pivoting portion 128 in any direction (i.e. three hundred sixty degrees) with respect to a first plane that is perpendicular with respect to a length of the second body 121 from the first end to the second end thereof. Also, the second body 121 may pivot a predetermined angle with respect to a second plane parallel to the length of the second body 121 from the first end to the second end. For example, the second body 121 may pivot thirty degrees forward, backward, left, and/or right.

The second connector 129 may be springingly (i.e., using a spring) disposed on at least a portion of the second end of the second body 121. The second connector 129 may be contact pins and include a battery therein.

The heart rate sensor 130 may be disposed within at least a portion of the first body 111 and/or the second body 121. The heart rate sensor 130 may detect a heart rate level in response to contact from the hand of the user. Additionally, for example, the heart rate sensor 130 may affect the video game in response to the heart rate level exceeding a predetermined heart rate level.

The base 140 may include a first joystick receiving groove 141, a second joystick receiving groove 142, and a power source 143, but is not limited thereto.

The first joystick receiving groove 141 may receive the first joystick 110 therein. Specifically, the first connector 119 may removably connect to the first joystick receiving groove 141.

The second joystick receiving groove 142 may receive the second joystick 120 therein. Specifically, the second connector 129 may removably connect to the second joystick receiving groove 142. As such, the base 140 may stabilize the first joystick 110 and/or the second joystick 120 while connected to the base 140.

The power source 143 may include a power inlet, a battery, and a solar cell, but is not limited thereto.

The power source 143 may be disposed on and/or within at least a portion of the base 140. The power source 143 may send power to the first joystick 110 through the first joystick receiving groove 141 in response to connecting the first connector 119 to the first joystick receiving groove 141. Similarly, the power source 143 may send power to the second joystick 120 through the second joystick receiving groove 142 in response to connecting the second connector 129 to the second joystick receiving groove 142. In other words, the base 140 may charge the first joystick 110 and/or the second joystick 120.

Optionally, the first body 111 and/or the second body 121 may be moved toward the base 140 in response to an application of force thereto, such that the first body 111 and/or the second body 121 may generate another at least one input, such as enter and/or accept based on the video game. Also, the first body 111 and/or the second body 121 may automatically return to an original position after removing the application of force due to a spring bias.

Therefore, the video game controller 100 may provide joystick and/or analog movement capabilities through movement of the first body 111 and/or the second body 121 while also providing buttons for depressing without having to move the thumbs.

The present general inventive concept may include a video game controller 100, including a first joystick 110, including a first body 111 having an elongate shape, and a directional pad 112 disposed on at least a portion of a first end of the first body 111 to input at least one input corresponding to each point of the directional pad 112, a second joystick 120, including a second body 121 having an elongate shape, and a plurality of action buttons 122 disposed on at least a portion of the second body 121 to input at least one action input in response to depressing at least one of the plurality of action buttons 122, and a base 140 to removably connect to at least one of a second end of the first body 111 and a second end of the second body 121.

The first joystick 110 may further include a first trigger button 113 disposed on at least a portion of a first side of the first body 111 to input a first trigger command in response to being depressed, a first bumper button 114 disposed on at least a portion of the first side of the first body 111 to input a first bumper command in response to being depressed, a first menu button 115 disposed on at least a portion of a second side of the first body 111 different from the first side to input a menu command in response to being depressed, and a first home button 116 disposed on at least a portion of the second side of the first body 111 to input a home menu command in response to being depressed.

The first joystick 110 may further include a plurality of finger receiving grooves 117 concavely disposed on at least a portion of the first side of the first body 111 to facilitate gripping thereof.

The second joystick 120 may further include a second trigger button 123 disposed on at least a portion of a first side of the second body 121 to input a second trigger command in response to being depressed, a second bumper button 124 disposed on at least a portion of the first side of the second body 121 to input a second bumper command in response to being depressed, a second menu button 125 disposed on at least a portion of a second side of the second body 121 different from the first side to input a menu command in response to being depressed, and a second home button 126 disposed on at least a portion of the second side of the second body 121 to input a home menu command in response to being depressed.

The second joystick 120 may further include a plurality of finger receiving grooves 127 concavely disposed on at least a portion of a first side of the second body 121 to facilitate gripping thereof.

The first joystick 110 and the second joystick 120, each may further include a pivoting portion disposed on the second end to facilitate movement in any direction with respect to a first plane.

The first joystick 110 and the second joystick 120, each may further include a connector disposed on at least a portion of the second end to receive power from the base.

The video game controller 100 may further include a heart rate sensor 130 disposed within at least a portion of at least one of the first body 111 and the second body 121 to detect a heart rate level in response to contact from a hand of the user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A video game controller, comprising:
   a first joystick, comprising:
      a first body having an elongate shape, and
      a directional pad disposed on at least a portion of a first end of the first body to input at least one input corresponding to each point of the directional pad;
   a second joystick, comprising:
      a second body having an elongate shape, and
      a plurality of action buttons disposed on at least a portion of the second body to input at least one action input in response to depressing at least one of the plurality of action buttons; and
   a base to removably connect to at least one of a second end of the first body and a second end of the second body, such that a bottom-most surface of the second end of the first body is flat to attach to a flat portion of the base, and a bottom-most surface of the second end of the second body is flat to attach to another flat portion of the base,
   wherein the first joystick further comprises a first pivoting portion disposed at the second end above a bottom-most surface of the second end of the first body, to facilitate movement of the first joystick in any direction with respect to a first plane, and
   wherein the second joystick further comprises a second pivoting portion disposed at the second end above a bottom-most surface of the second end of the second body, to facilitate movement of the second joystick in any direction with respect to a first plane.

2. The video game controller of claim 1, wherein the first joystick further comprises:
   a first trigger button disposed on at least a portion of a first side of the first body to input a first trigger command in response to being depressed;
   a first bumper button disposed on at least a portion of the first side of the first body to input a first bumper command in response to being depressed;
   a first menu button disposed on at least a portion of a second side of the first body different from the first side to input a menu command in response to being depressed; and
   a first home button disposed on at least a portion of the second side of the first body to input a home menu command in response to being depressed.

3. The video game controller of claim 1, wherein the first joystick further comprises:
   a plurality of finger receiving grooves concavely disposed on at least a portion of the first side of the first body to facilitate gripping thereof.

4. The video game controller of claim 1, wherein the second joystick further comprises:
   a second trigger button disposed on at least a portion of a first side of the second body to input a second trigger command in response to being depressed;
   a second bumper button disposed on at least a portion of the first side of the second body to input a second bumper command in response to being depressed;
   a second menu button disposed on at least a portion of a second side of the second body different from the first side to input a menu command in response to being depressed; and a second home button disposed on at least a portion of the second side of the second body to input a home menu command in response to being depressed.

5. The video game controller of claim 1, wherein the second joystick further comprises:
   a plurality of finger receiving grooves concavely disposed on at least a portion of a first side of the second body to facilitate gripping thereof.

6. The video game controller of claim 1, wherein the first joystick and the second joystick, each further comprise:
   a connector disposed on at least a portion of the second end to receive power from the base.

7. The video game controller of claim 1, further comprising:
   a heart rate sensor disposed within at least a portion of at least one of the first body and the second body to detect a heart rate level in response to contact from a hand of the user.

\* \* \* \* \*